(12) United States Patent
Velummylum et al.

(10) Patent No.: US 9,219,945 B1
(45) Date of Patent: Dec. 22, 2015

(54) EMBEDDING CONTENT OF PERSONAL MEDIA IN A PORTION OF A FRAME OF STREAMING MEDIA INDICATED BY A FRAME IDENTIFIER

(75) Inventors: Piragash Velummylum, Seattle, WA (US); Johanna S. Olson, Bellevue, WA (US); Korwin J. Smith, Seattle, WA (US); James H. Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 799 days.

(21) Appl. No.: 13/161,774

(22) Filed: Jun. 16, 2011

(51) Int. Cl.
| | |
|---|---|
| G06F 15/16 | (2006.01) |
| G06F 15/173 | (2006.01) |
| H04N 7/10 | (2006.01) |
| H04N 7/025 | (2006.01) |
| H04N 21/458 | (2011.01) |
| H04N 21/462 | (2011.01) |
| H04N 21/234 | (2011.01) |
| H04N 21/44 | (2011.01) |
| H04H 60/20 | (2008.01) |
| H04N 21/84 | (2011.01) |
| G11B 27/036 | (2006.01) |
| H04N 21/235 | (2011.01) |
| H04N 21/81 | (2011.01) |
| H04N 21/658 | (2011.01) |

(52) U.S. Cl.
CPC ............ H04N 21/458 (2013.01); G11B 27/036 (2013.01); H04H 60/20 (2013.01); H04N 21/235 (2013.01); H04N 21/23412 (2013.01); H04N 21/23418 (2013.01); H04N 21/23424 (2013.01); H04N 21/44008 (2013.01); H04N 21/4622 (2013.01); H04N 21/8126 (2013.01); H04N 21/84 (2013.01); *H04N 21/6581* (2013.01)

(58) Field of Classification Search
CPC ........ G11B 27/036; G06F 7/06; H04H 60/20; H04N 21/4318; H04N 21/44008; H04N 21/6581; H04N 21/84; H04N 21/235; H04N 21/8126; H04N 21/23412; H04N 21/458; H04N 21/4622; H04N 21/23424; H04N 21/23418
USPC .............................. 709/217, 225; 725/32, 34
See application file for complete search history.

(56) References Cited

U.S. PATENT DOCUMENTS

| | | | | |
|---|---|---|---|---|
| 5,416,529 | A | * | 5/1995 | Lake .............................. 348/590 |
| 5,422,674 | A | * | 6/1995 | Hooper et al. ............ 375/240.15 |
| 5,715,018 | A | * | 2/1998 | Fasciano et al. ............... 348/722 |
| 6,029,045 | A | * | 2/2000 | Picco et al. ...................... 725/34 |
| 6,323,861 | B1 | * | 11/2001 | Carraro et al. ................. 345/428 |
| 6,680,739 | B1 | * | 1/2004 | Robertus et al. ............... 345/581 |
| 6,757,027 | B1 | * | 6/2004 | Edwards et al. ............... 348/722 |
| 6,944,585 | B1 | * | 9/2005 | Pawson ........................... 703/22 |
| 7,015,979 | B1 | * | 3/2006 | Lord et al. ..................... 348/607 |

(Continued)

*Primary Examiner* — Daniel C Murray
(74) *Attorney, Agent, or Firm* — Thomas | Horstemeyer, LLP

(57) ABSTRACT

Disclosed are various embodiments for generating personalized streaming media based on a streaming media received from a broadcast source. In one embodiment, a media service receives a request to generate the personalized streaming media from a client. In response to the request, the media service application determines the content of the streaming media and identifies files in a file system of a user that include content related to the streaming media. Upon identifying the related files, the media service application embeds the content of the related files in a relevant portion of the streaming media to generate the personalized streaming media. The media service application then transmits the personalized streaming media to the client.

19 Claims, 6 Drawing Sheets

(56) References Cited

U.S. PATENT DOCUMENTS

| | | | |
|---|---|---|---|
| 7,312,803 B2* | 12/2007 | Wilkins | 345/629 |
| 7,460,731 B2* | 12/2008 | Senftner et al. | 382/284 |
| 7,484,103 B2* | 1/2009 | Woo et al. | 713/189 |
| 7,610,597 B1* | 10/2009 | Johnson et al. | 725/32 |
| 7,613,691 B2* | 11/2009 | Finch | 1/1 |
| 7,624,416 B1* | 11/2009 | Vandermolen et al. | 725/109 |
| 7,873,982 B2* | 1/2011 | Smith et al. | 725/136 |
| 7,912,217 B2* | 3/2011 | Baugher et al. | 380/200 |
| 7,974,493 B2* | 7/2011 | Senftner et al. | 382/282 |
| 8,005,973 B2* | 8/2011 | Collet et al. | 709/231 |
| 8,074,248 B2* | 12/2011 | Sigmon et al. | 725/110 |
| 8,156,435 B2* | 4/2012 | Wohlert | 715/716 |
| 8,219,536 B2* | 7/2012 | Wohlert | 707/694 |
| 8,245,252 B2* | 8/2012 | Gee et al. | 725/36 |
| 8,266,246 B1* | 9/2012 | Cho et al. | 709/217 |
| 8,340,498 B1* | 12/2012 | Gill et al. | 386/241 |
| 8,356,324 B2* | 1/2013 | Rajakarunanayake | 725/88 |
| 8,397,253 B2* | 3/2013 | McDonough et al. | 725/32 |
| 8,495,674 B1* | 7/2013 | Johnson et al. | 725/32 |
| 8,495,675 B1* | 7/2013 | Philpott et al. | 725/34 |
| 8,510,771 B2* | 8/2013 | Casagrande et al. | 725/32 |
| 8,527,877 B2* | 9/2013 | Wohlert | 715/716 |
| 8,539,523 B2* | 9/2013 | Philpott et al. | 725/32 |
| 8,542,743 B2* | 9/2013 | Van Den Berghe | 375/240.24 |
| 8,589,992 B2* | 11/2013 | Babic | 725/87 |
| 8,843,957 B2* | 9/2014 | Lemire et al. | 725/36 |
| 9,031,127 B2* | 5/2015 | Hannuksela | 375/240.01 |
| 9,042,454 B2* | 5/2015 | Gordon et al. | 375/240.16 |
| 9,077,860 B2* | 7/2015 | Sigmon et al. | 1/1 |
| 2002/0059604 A1* | 5/2002 | Papagan et al. | 725/51 |
| 2002/0083184 A1* | 6/2002 | Elliott | 709/232 |
| 2002/0092019 A1* | 7/2002 | Marcus | 725/37 |
| 2002/0156842 A1* | 10/2002 | Signes et al. | 709/203 |
| 2002/0171670 A1* | 11/2002 | Clernock et al. | 345/629 |
| 2003/0135553 A1* | 7/2003 | Pendakur | 709/205 |
| 2003/0177063 A1* | 9/2003 | Currans et al. | 705/14 |
| 2003/0191850 A1* | 10/2003 | Thornton | 709/231 |
| 2003/0212811 A1* | 11/2003 | Thornton | 709/231 |
| 2004/0049780 A1* | 3/2004 | Gee | 725/32 |
| 2005/0278565 A1* | 12/2005 | Frattura et al. | 714/5 |
| 2006/0015904 A1* | 1/2006 | Marcus | 725/46 |
| 2006/0074744 A1* | 4/2006 | Bodlaender et al. | 705/14 |
| 2006/0090010 A1* | 4/2006 | Qin | 709/246 |
| 2007/0005795 A1* | 1/2007 | Gonzalez | 709/232 |
| 2007/0022215 A1* | 1/2007 | Singer et al. | 709/246 |
| 2007/0061364 A1* | 3/2007 | Klein, Jr. | 707/104.1 |
| 2007/0061759 A1* | 3/2007 | Klein, Jr. | 715/853 |
| 2007/0088844 A1* | 4/2007 | Seims | 709/231 |
| 2007/0244983 A1* | 10/2007 | Berger | 709/217 |
| 2007/0300249 A1* | 12/2007 | Smith et al. | 725/19 |
| 2007/0300250 A1* | 12/2007 | Smith et al. | 725/20 |
| 2008/0019576 A1* | 1/2008 | Senftner et al. | 382/118 |
| 2008/0120364 A1* | 5/2008 | Chari et al. | 709/203 |
| 2008/0126109 A1* | 5/2008 | Cragun et al. | 705/1 |
| 2008/0127272 A1* | 5/2008 | Cragun et al. | 725/46 |
| 2008/0134278 A1* | 6/2008 | Al-Karmi | 725/141 |
| 2008/0168489 A1* | 7/2008 | Schraga | 725/32 |
| 2008/0170622 A1* | 7/2008 | Gordon et al. | 375/240.18 |
| 2008/0235722 A1* | 9/2008 | Baugher et al. | 725/32 |
| 2008/0263098 A1* | 10/2008 | Kindig | 707/104.1 |
| 2009/0080855 A1* | 3/2009 | Senftner et al. | 386/52 |
| 2009/0089354 A1* | 4/2009 | Kim et al. | 709/201 |
| 2009/0122873 A1* | 5/2009 | Van Den Berghe | 375/240.24 |
| 2009/0244289 A1* | 10/2009 | Raake et al. | 348/180 |
| 2009/0257730 A1* | 10/2009 | Chen et al. | 386/52 |
| 2009/0307732 A1* | 12/2009 | Cohen et al. | 725/87 |
| 2010/0036808 A1* | 2/2010 | Lee | 707/3 |
| 2010/0049862 A1* | 2/2010 | Dixon | 709/231 |
| 2010/0057926 A1* | 3/2010 | Cao et al. | 709/231 |
| 2010/0131527 A1* | 5/2010 | Wohlert | 707/758 |
| 2010/0131844 A1* | 5/2010 | Wohlert | 715/716 |
| 2010/0131895 A1* | 5/2010 | Wohlert | 715/811 |
| 2010/0145938 A1* | 6/2010 | Boetje et al. | 707/736 |
| 2010/0162291 A1* | 6/2010 | Casagrande et al. | 725/25 |
| 2010/0202750 A1* | 8/2010 | Senftner et al. | 386/52 |
| 2010/0299191 A1* | 11/2010 | Fernandez Gutierrez | 705/14.5 |
| 2010/0313131 A1* | 12/2010 | Yuen | 715/719 |
| 2010/0332329 A1* | 12/2010 | Roberts et al. | 705/14.66 |
| 2011/0023063 A1* | 1/2011 | McDonough et al. | 725/46 |
| 2011/0145370 A1* | 6/2011 | Nieuwenhuys | 709/219 |
| 2011/0145858 A1* | 6/2011 | Philpott et al. | 725/32 |
| 2011/0302308 A1* | 12/2011 | Prodan et al. | 709/225 |
| 2011/0314493 A1* | 12/2011 | Lemire et al. | 725/32 |
| 2011/0321086 A1* | 12/2011 | Buchheit et al. | 725/34 |
| 2012/0047542 A1* | 2/2012 | Lewis et al. | 725/97 |
| 2012/0137337 A1* | 5/2012 | Sigmon et al. | 725/110 |
| 2012/0143996 A1* | 6/2012 | Liebald et al. | 709/219 |
| 2012/0180083 A1* | 7/2012 | Marcus | 725/32 |
| 2012/0192221 A1* | 7/2012 | McDonough et al. | 725/31 |
| 2012/0192226 A1* | 7/2012 | Zimmerman et al. | 725/34 |
| 2012/0227077 A1* | 9/2012 | Spivack et al. | 725/110 |
| 2012/0246279 A1* | 9/2012 | Zang et al. | 709/219 |
| 2012/0254755 A1* | 10/2012 | Wohlert | 715/716 |
| 2012/0297417 A1* | 11/2012 | Philpott et al. | 725/34 |
| 2013/0046781 A1* | 2/2013 | Frankel et al. | 707/769 |
| 2013/0073684 A1* | 3/2013 | Fernandez Gutierrez | 709/218 |
| 2013/0097642 A1* | 4/2013 | Cragun et al. | 725/59 |
| 2013/0173709 A1* | 7/2013 | Yerli | 709/204 |
| 2013/0202150 A1* | 8/2013 | Sinha et al. | 382/100 |
| 2013/0204889 A1* | 8/2013 | Sinha et al. | 707/758 |
| 2013/0205212 A1* | 8/2013 | Sinha et al. | 715/719 |
| 2013/0205315 A1* | 8/2013 | Sinha et al. | 725/14 |
| 2013/0205316 A1* | 8/2013 | Sinha et al. | 725/14 |
| 2013/0205317 A1* | 8/2013 | Sinha et al. | 725/14 |
| 2013/0205318 A1* | 8/2013 | Sinha et al. | 725/14 |
| 2013/0205319 A1* | 8/2013 | Sinha et al. | 725/14 |
| 2013/0205321 A1* | 8/2013 | Sinha et al. | 725/19 |
| 2013/0205322 A1* | 8/2013 | Sinha et al. | 725/19 |
| 2013/0205323 A1* | 8/2013 | Sinha et al. | 725/19 |
| 2013/0205324 A1* | 8/2013 | Sinha et al. | 725/23 |
| 2013/0205325 A1* | 8/2013 | Sinha et al. | 725/23 |
| 2013/0205326 A1* | 8/2013 | Sinha et al. | 725/23 |
| 2013/0205330 A1* | 8/2013 | Sinha et al. | 725/28 |
| 2013/0205335 A1* | 8/2013 | Sinha et al. | 725/32 |
| 2013/0205338 A1* | 8/2013 | Sinha et al. | 725/34 |
| 2013/0212609 A1* | 8/2013 | Sinha et al. | 725/19 |
| 2013/0238757 A1* | 9/2013 | Cho et al. | 709/218 |
| 2013/0275611 A1* | 10/2013 | Somekh et al. | 709/231 |
| 2013/0290307 A1* | 10/2013 | Boetje et al. | 707/722 |
| 2014/0086338 A1* | 3/2014 | Lu et al. | 375/240.26 |
| 2014/0099066 A1* | 4/2014 | Jang et al. | 386/230 |
| 2014/0363143 A1* | 12/2014 | Dharssi et al. | 386/282 |

* cited by examiner

EMBEDDING CONTENT OF PERSONAL MEDIA IN A PORTION OF A FRAME OF STREAMING MEDIA INDICATED BY A FRAME IDENTIFIER

BACKGROUND

Many users consume media on a plurality of devices, such as, for example, personal computers and handheld devices. For example, the media may include television shows, movies, music, pictures, and/or any other type of media. A plurality of broadcast sources may transmit the media and the user may consume the received media by purchasing the media, renting the media, watching the media, playing the media, and/or consume the media in any other manner.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments for generating personalized streaming media based on streaming media received from a broadcast source. In one embodiment, a media service application determines the content of the streaming media and identifies files in a file system of a user that include content related to the streaming media. Upon identifying the related files, the media service application embeds the content of the related files in a relevant portion of the streaming media to generate the personalized streaming media. In the following discussion, a general description of the system and its components is provided, followed by a discussion of the operation of the same.

Figure 1:
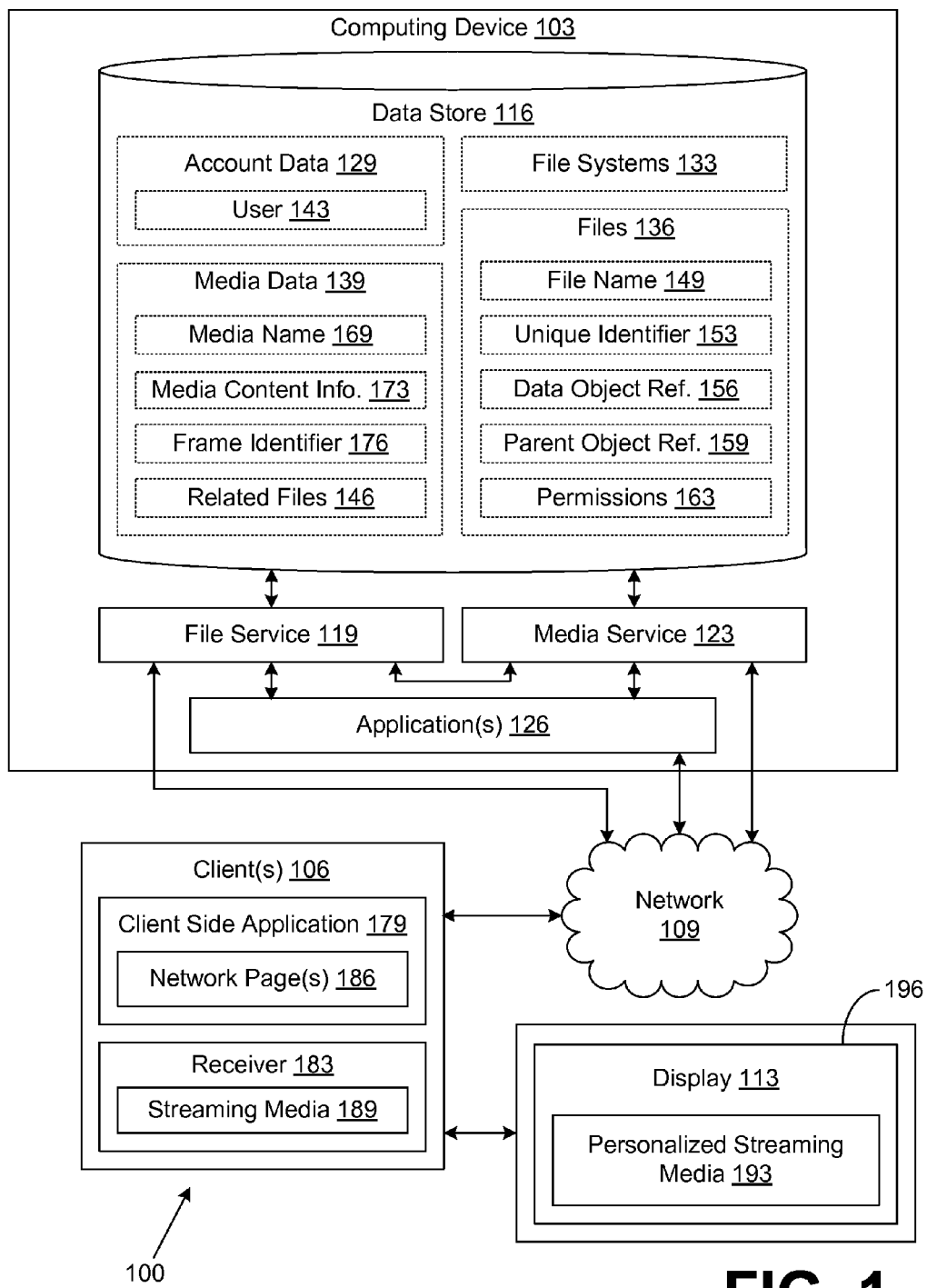
FIG. 1 is a drawing of a networked environment according to various embodiments of the present disclosure.

With reference to FIG. 1, shown is a networked environment 100 according to various embodiments. The networked environment 100 includes a computing device 103, a client 106, a network 109, and a display 113. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below.

The components executed on the computing device 103, for example, include a file service 119, a media service 123, and other applications 126, services, processes, systems, engines, or functionality not discussed in detail herein. The file service 119 is executed to maintain a file organization of files and folders in file systems associated with service accounts. To this end, the file service 119 may support various file-related operations such as, for example, creating files, deleting files, modifying files, setting permissions for files, downloading data files, and/or other operations. The media service 123 is executed to identify content of streaming media and embed content of files of a user's file system in relevant portions of the streaming media. To this end, the media service 123 may support various media-related operations such as, for example, determining media content, identifying files related to the content, editing the media, and/or other operations.

The applications 126 correspond to hosted applications that may access the data stored in the file system. Various applications 126 may, for example, have a web-based interface that may serve up network pages, such as web pages or other forms of network content, to facilitate user interaction. Other applications 126 may include internal applications that may not have a web-based interface. For example, the applications 126 may include media organizing tools, media consuming tools, word processors, email applications, and/or other applications 126.

The data stored in the data store 116 includes, for example, account data 129, file systems 133, files 136, media data 139, and potentially other data. The account data 129 includes various data associated with file service accounts including data regarding authorized user(s) 143 of the computing device 103. In addition, account data 129 may also include usernames, passwords, security credentials, file management permissions, storage quotas and limitations, authorized applications, purchasing information, payment instrument information, billing information, and/or other data.

The file systems 133 correspond to logical file organizations that are maintained within the computing device 103 on behalf of one or more authorized users associated with a file service account. In various embodiments, the logical file organizations embodied in the file systems 133 are abstractions that do not directly correspond to any particular physical storage arrangements such as disk drives, portable storage media, etc. A file service account may be associated with one or more file systems 133. Each account-level user may have its own file system 133, or the file systems 133 may be shared by multiple account-level users.

Each file system 133 may include one or more files 136. A file 136 may include a file name 149, a unique identifier 153, a data object reference 156, a parent object reference 159, one or more permissions 163, a file creation date, a file modification date, and/or other data. The file name 149 may correspond to a human-readable character string that identifies the contents of the file 136. In one embodiment, the file name 149 may be limited in character length and may be limited in terms of allowed characters. In some cases, such limitations may be enforced for compatibility reasons. In addition, the file name 149 may be restricted to being unique to a folder and/or a file system 133 in various embodiments.

The unique identifier 153 corresponds to a number, character string, or other identifier that uniquely identifies the file 136 across the file system 133 and/or all of the file systems 133. In one embodiment, the unique identifier 153 of a file 136 coupled with an identifier of a file system 133 may correspond to an identifier that is unique across all of the file systems 133. In another embodiment, the unique identifier 153 of a file 136 may itself be unique across all of the file systems 133.

The data object reference 156 corresponds to a reference that may identify a data object associated with the file 136 that is stored in a data store such as the data store 116. In one embodiment, the data object reference 156 may include a key value for obtaining the data object. The data stored from which to obtain the data object may be determined implicitly or explicitly, for example, from a definition in the data object reference 156. The parent object reference 159 corresponds to a reference that may identify a folder or file 136 that is considered to be the parent of the file 136. In this way, the folders are associated with files 136. In some situations, the parent object reference 159 may include a special identifier, such as, for example, NULL and/or 0, that identifies the root of the file system 133.

The permissions 163 may correspond to access permissions and security policies associated with the file 136. For example, a user may be designated as a file owner, and a group of users may be designated as a file group. In such an example, read or write access may be enabled or disabled as it applies to the user, the group of users, and/or all users. Similarly, access to a file 136 may be enabled or disabled as it applies to a file service account, a group of file service accounts, and/or all file service accounts. In another embodiment, each file 136 may also have an associated metadata that describes the content of the file 136. For example, the metadata may comprise text that includes keywords describing the content and/or type of file 136.

The media data 139 corresponds to information that is associated with streaming media received from a variety of sources. The media data 139 includes information for a plurality of different media and may include a media name 169, a media content information 173, a frame identifier 176, and a listing of related files 146. For example, the media name 169 may be a sequence of characters that uniquely identifies the media. The media content information 173 may be a description of the media being consumed. In one embodiment, the media content information 173 may include a listing of keywords that describe the media. For example, the media may be a video clip and the media content information 173 may describe the contents of the video for each frame having a unique frame identifier 176. In addition, the related files 146 may be a listing of file names 149 that relate to the media content information 173.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 179, a receiver application 183, and/or other applications. The client side application 179 may be executed in a client 106, for example, to access and render network pages 186, such as web pages, or other network content served up by the computing device 103 and/or other servers. To this end, the client side application 179 may comprise, for example, a browser application or a similar application. When executed in the client, the client side application 179 renders network pages 186 on the display 113. Network pages 186 indicating content (e.g. files 136) of a file system 133 can include media. In one embodiment, the client side application 179 is integrated with an operating system of the client 106 to provide access to a file system 133 similarly to a mounted file system of the client 106. The client 106 may be configured to execute applications beyond client side application 179 such as, for example, email applications, instant message applications, and/or other applications.

The receiver application 183 may be configured to process streaming media 189 from a source such as a cable system, a broadcast source, an/or another media transmission medium that is rendered, for example, on a display 113. Additionally, the receiver application 183 makes the processed streaming media 189 available to the computing device 103 which is then used by the computing device 103 for generating personalized streaming media 193, as will be described. For example, the client side application 179 renders the personalized streaming media 193 on a screen 196 associated with the display 113.

Next, a general description of the operation of the various components of the networked environment 100 is provided. To begin, a user may establish a file service account through the client side application 179, or another application 126 to create one or more file systems 133. The file service 119 and/or one or more applications 126 of the computing device 103 may provide a user interface to allow the user to create the file service account by generating one or more network page(s) 186 in response to user actions. The user may specify various parameters, such as, for example, a maximum storage requirement, performance requirements, a rate plan, access permissions, security credentials, and so on. Accordingly, the account data 129 corresponding to the established file service account is populated and a file system 133 may be created. The file service 119 and/or another application(s) 126 may also provide a user interface to allow the user to access and/or manipulate the content of the file system(s) 133 associated with the established account, such as, for example, adding, deleting, copying, viewing, and/or any other type of consumption of the files 136.

In one embodiment, the user may wish to consume streaming media 189 on a display 113 associated with the client 106. In addition, the user may sometimes wish to view content from personal files 136 of the established file system 133 as part of the streaming media 189. For instance, the user may wish to view a personalized streaming media 193 that includes relevant content from the user's files 136 embedded within the streaming media 189. In one embodiment, the media service 123 identifies the content of the streaming media 189 and embeds the content of files 136 related to the content of the streaming media 189 to create personalized streaming media 193. As an example, the streaming media 189 may be a film including a scene of a man examining a portrait on a wall. In this scene, the portrait may be irrelevant. The media service 123 may substitute the portrait with an image from the user's files 136 that is displayed on the wall. As such, the media service 123 generates a personalized streaming media 193 by including content from a user's personal files 136 that are related to the streaming media 189.

In one embodiment, the receiver application 183 receives the streaming media 189 from a broadcast source such as, for instance a broadcast center via a plurality of satellites. The receiver application 183 processes the streaming media 189 and communicates the streaming media 189 to the display 113 to be rendered on the screen 196. The streaming media 189 may comprise television shows, commercials, infomercials, movies, documentaries, videos on demand, music, holograms, three-dimensional video, and/or any other type of media. Upon an indication by the user to include content from the user's files 136 in the streaming media, the client side application 179 generates and transmits a request to the media service 123 to generate the personalized streaming media 193. For instance, the user may request personalized streaming media 193 by activating a button on a remote control device associated with the display 113.

Upon receiving the request, the media service 123 determines the content of the streaming media 189 being received by the receiver application 183. In one embodiment, the media service 123 determines the media content information 173 from a metadata associated with the broadcast of the streaming media 189. For instance, the media content information 173 may comprise lyrics of a song, a transcript for the audio component of a movie, text summarizing the subject matter of the media, text summarizing the media on a per frame basis, and/or any other description of the media. In another embodiment, the media content information 173 may comprise a closed-caption of the media if closed-captioning is provided with the streaming media 189 and/or any other type of audio transcription of the streaming media 189.

Having determined the media content information 173, the media service 123 may store the data in the data store 116. For instance, the media service 123 may determine the media name 169 by parsing the metadata associated with the broadcast of the streaming media 189. As example, the media service 123 may store the name of the streaming media 189 as the media name 169, the content of the metadata as the media content information 173, and any frame identification information as the frame identifier 176 if the media content information 173 is specific to specific video frames of the streaming media 189. In one embodiment, the frame identifier 176 may correspond to specific portion of the streaming media 189 described by the media content information 173.

Next, the media service 123 identifies the files 136 in the user's file system 133 that relate to the content of the streaming media 189. In one embodiment, the media service 123 may search the user's file system 133 for files 136 having file names 149 that match the media name 169 associated with the streaming media 189. The media service 123 may determine that that files 136 with a file name 149 that match the media name 169 of the streaming media 189 may be related. In another embodiment, the media service 123 may search the user's file system 133 for files 136 matching the media content information 173. For example, the media service 123 may search for file names 149 of the files 136 in the file system 133 that match the media content information 173. The media service 123 may determine that any files 136 with file names 149 that match the media content information 173 relate to the content of the streaming media 189. For instance, using the above example, the user may have an image file 136 of a famous painting prepared by the user having a file name 149 that matches the media name 169 of a streaming media 189 and/or the media content information 173 of the streaming media 189. The media service 123 determines that the image file 136 is related to the streaming media 189 by finding a match between the file name 149 of the image 136 and the media name 169 and/or the media content information 173 of the streaming media 189.

In another embodiment, the media service 123 may also search metadata associated with files 136 to identify the files that are related to the streaming media 189. For example, the metadata may include a description of the subject matter of the files, such as for instance, lyrics of a music file, transcript of a video file, a description of a picture file, and/or other description. The media service 123 may compare the content of the metadata associated with each of the files 136 with the media content information 173 to identify files 136 that are related to the streaming media 189. Having identified the files 136 related to the streaming media 189, the media service 123 stores a listing of the identified files 136 in the data store 116 as related files 146. For instance, the media service 123 associates the listing of related files 146 with the media data 139 for each streaming media 189.

Next, the media service 123 gathers the content of the related files 146 to generate the personalized streaming media 193. For instance, the related files 146 may include a listing of file names 149 identifying the related files, as described above. In one embodiment, the media service 123 determines the content from the data object reference 156 associated with each of the file names 149 in the listing of related files 146. For example, the data object reference 156 includes a key value that identifies the data object associated with the file name 149. In one embodiment, the media server 123 determines that the data object associated with the file name 149 is the content of the file 136.

Once the content of each of the related files 146 is determined, the media service 123 embeds the content of the related files 146 in relevant portion of the streaming media 189 to generate the personalized streaming media 193. As an example, the content of a related file 146 may be an image and/or any other type of media. The media service 123 includes the image in a relevant portion of the streaming media 189 to generate the personalized streaming media 193. In addition, the content of the related file 146 may be music, a video clip, a three-dimensional video, and/or any other type of media. The media service 123 may include the media found in the related files 146 in a relevant portion of the streaming media 189.

In one embodiment, the media service 123 identifies the relevant portion of the streaming media 189 to include the content of the related files 146 from frame identifier 176. For instance, the relevant frame for the media content information 173 is stored as the frame identifier 176 in the media data 139, as described above. Using the above example, the media service 123 includes the image and/or any other type of media in the frame identified by the frame identifier 176. In one embodiment, the media service embeds the image into the video frame to generate the personalized streaming media 193. Similarly, the media service may embed any other type of media file, such as, for instance, overlaying a music file as the audio portion of a video clip, embed a video file as video playing in the background of the video clip, and/or any other approach to embed a media file into a video clip. Upon generating the personalized streaming media 193, the media service 123 transmits the personalized streaming media 193 to the requesting service, such as, for instance, the client side application 179 and/or any other application 126.

In one embodiment, the streaming media 189 may include identifiers within the media that can be used for embedding the content of the related files 146. For instance, using the above example where the streaming media 189 is a video, the streaming media 189 may include one or more header frames that include frame data that can be used for embedding the content of related files 146. As an example, the media service 123 may use the frame data to identify relevant portions of the streaming media 189 for embedding the content of the related files 146. In this embodiment, the frame data may indicate a type of media file 136 that may be embedded within the frame associated with the frame data. For instance, the frame data may indicate that the frame may be compatible for an image file 136, an audio file 136, a video file 136, and/or any other type of media file 136 to be embedded within a particular frame. As such, the media service 123 may only embed relevant files 146 that include content compatible with the types of media files 136 indicated by the frame data.

Figure 2:
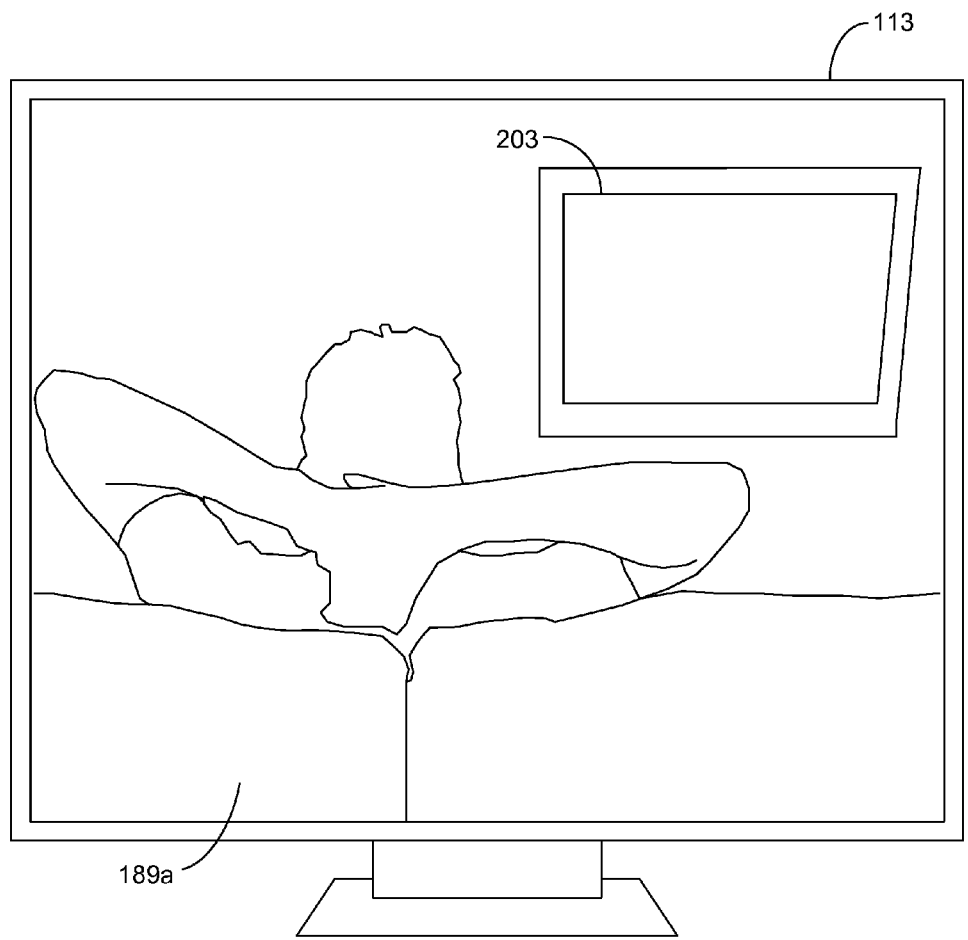
FIGS. 2 and 3 are drawings of an example of media rendered by a client in the networked environment of FIG. 1 according to various embodiments of the present disclosure.

Referring next to FIG. 2, shown is one example of streaming media 189, denoted herein as network page 189a, according to various embodiments of the present disclosure. In one embodiment, the streaming media 189a rendered on the display 113 may depict television shows, television commercials, television infomercials, movies, videos on demand, and/or any other type of streaming media, as discussed above. In this example, the media service 123 (FIG. 1) may determine that the streaming media 189a being rendered on the display 113 includes a video frame of a person examining a portrait 203 hanging on a wall. In one embodiment, the media service may determine the content of the streaming media 189a from the media content information 173, as described above.

Figure 3:
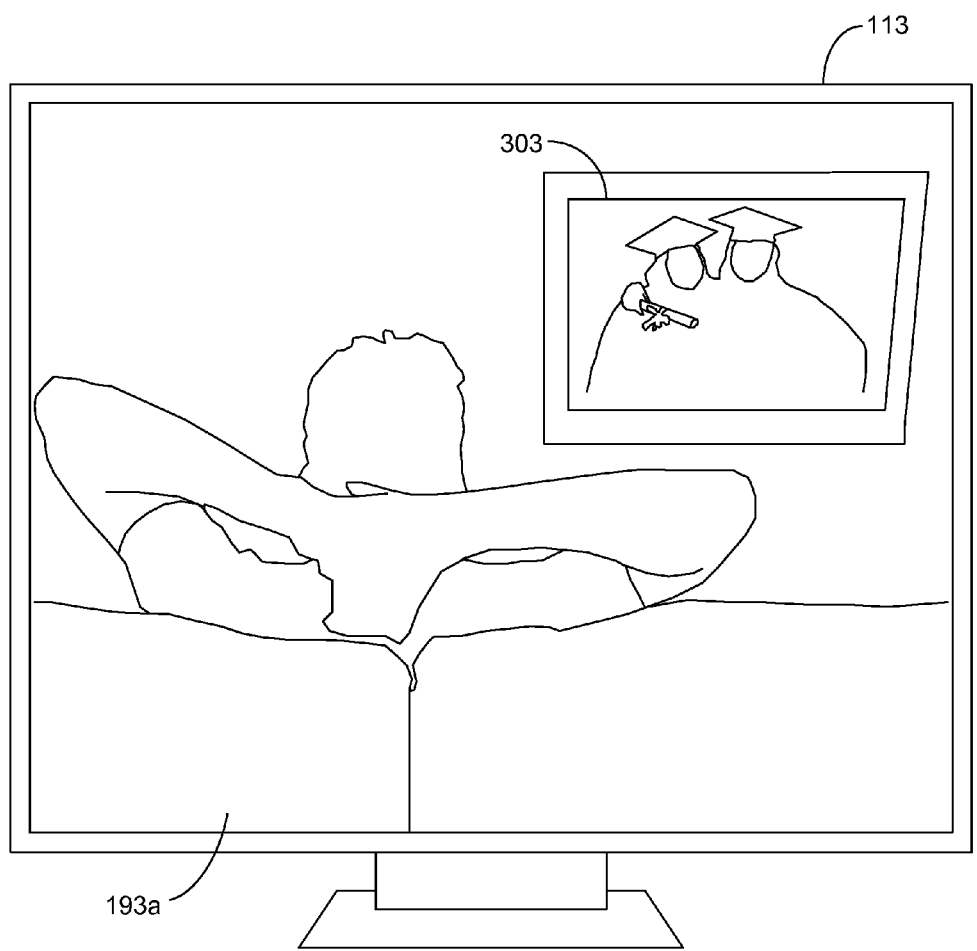

Referring next to FIG. 3, shown is one example of personalized streaming media 193, denoted herein as network page 193a, according to various embodiments of the present disclosure. In one embodiment, the personalized streaming media 193a rendered on the display 113 includes content from a user's file system 133 (FIG. 1) that is related to the content of the streaming media 189a (FIG. 2). In this example, the media service 123 (FIG. 1) embeds an image file 136 (FIG. 1) related to the content of the streaming media 189a to generate the personalized streaming media 193a. For instance, the media service 123 determines the content of the streaming media 189a from the media content information 173 and identifies related files 146 (FIG. 1) based on the content of the files 136 (FIG. 1) of the user's file system 133 (FIG. 1), as described above. The media service 123 then embeds the content of the related files 146 within a relevant portion of the streaming media 189a to generate the personalized streaming media 193a, as shown in FIG. 3.

Figure 4:
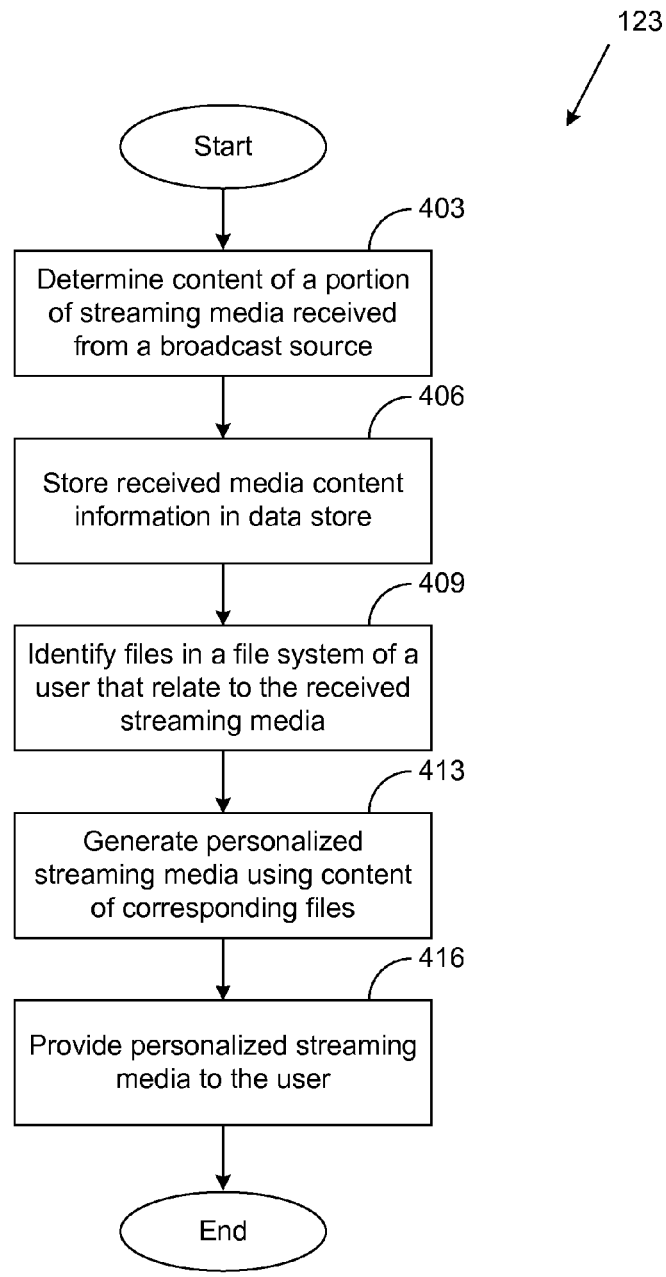
FIG. 4 is a flowchart illustrating one example of functionality implemented as portions of media service executed in a computing device in the networked environment of FIG. 1 according to various embodiments of the present disclosure.

Moving on to FIG. 4, shown is a flowchart that provides one example of the operation of a portion of the media service 123 according to various embodiments. It is understood that the flowchart of FIG. 4 provides merely an example of the many different types of functional arrangements that may be employed to implement the operation of the portion of the media service 123 as described herein. As an alternative, the flowchart of FIG. 4 may be viewed as depicting an example of steps of a method implemented in the computing device 103 (FIG. 1) according to one or more embodiments.

According to one embodiment, the media service 123 generates personalized streaming media 193 (FIG. 1) based on the content of streaming media 189 (FIG. 1) rendered on a display 113 (FIG. 1) associated with the client 106 (FIG. 1). For example, the media service 123 determines the content of the streaming media 189 from the media content information 173 (FIG. 1) associated with the streaming media 189 and identifies related files 146 with content related to the media content information 173. The media service 123 then includes the content of the related files 146 in a relevant portion of the streaming media 189 to generate personalized streaming media 193.

Beginning with box 403, the media service 123 determines the content of the streaming media 189 received from a broadcast source. In one embodiment, the media service 123 determines the content of the streaming media 189 from a metadata associated with the streaming media 189. For example, the metadata may include a summary of the streaming media 189a, closed captioning of the streaming media 189a, a frame-by-frame description of the streaming media 189a, a transcript of the streaming media 189a, and/or any other type of description of the streaming media 189. The media service 123 may parse the metadata of the streaming media 189 to search for keywords that describe the content of the streaming media 189.

Then, in box 406, the media service 123 stores the keywords and any other information from the metadata in a data store 116 (FIG. 1) associated with the media service 123. For example, the media service 123 stores a name of the streaming media 189 as the media name 169 (FIG. 1), the keywords describing the content of the streaming media 189 as the media content information 173 (FIG. 1), and/or any other information describing the streaming media 189. In addition, the media service 123 may also store a frame identifier 176 that indicates a location of a relevant portion in the streaming media 189, as described above.

Next, in box 409, the media service 123 identifies files 136 (FIG. 1) in a file system 133 (FIG. 1) that relate to the content of the streaming media 189 and stores the identity of the files 136 that relate as a listing of related files 146. In one embodiment, the media service 123 identifies the related files 146 by matching file names 149 of the files 136 and/or metadata describing the content of the files 136 with the media content information 173 of the streaming media 189, as described above. In another embodiment, the media service 123 may also identify the related files 146 by matching the media name 169 with the file names 149 of the files 136 in the file system 133.

Then, in box 413, the media service 123 generates personalized streaming media 193 (FIG. 1) using the content of the related files 146. In one embodiment, the media service 123 gathers the content of one of the related files 146 from the file system 133. For example, the media service 123 may gather the content identified by the data object reference 156 of the respective file 136. Upon gathering the content of related file 146, the media service 123 embeds the content in a relevant portion of the streaming media 189 as identified by the frame identifier 176 to generate the personalized streaming media 193. For example, the media service 123 may substitute a portrait in a video frame identified by the frame identifier 176 with an image file 136 from the file system 133, as described above. Finally, as shown in box 416, the media service 123 transmits the personalized streaming media 193 to the requesting service.

Figure 5:
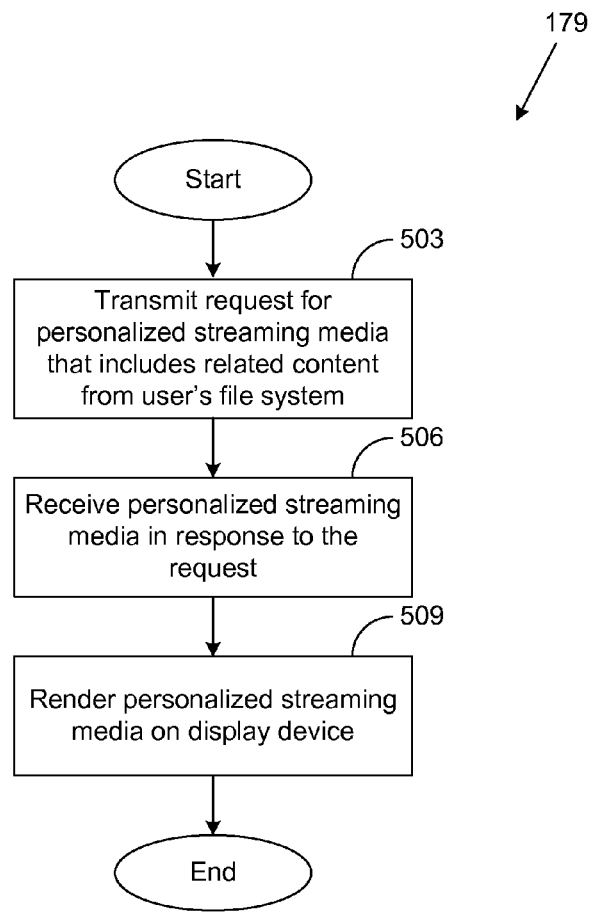
FIG. 5 is a flowchart illustrating one example of the operation of a portion of a client side application of a client device according to various embodiments.

Referring next to FIG. 5, shown is a flowchart that provides one example of the operation of a portion of the client side application 179 according to various embodiments. It is understood that the flowchart of FIG. 5 provides merely an example of the many different types of functional arrangements that may be employed to implement the operation of the portion of the client side application 179 as described herein. As an alternative, the flowchart of FIG. 5 may be viewed as depicting an example of steps of a method implemented in the client 106 (FIG. 1) according to one or more embodiments.

According to one embodiment, the client side application 179 generates a request for personalized streaming media 193 (FIG. 1) that includes content from a file system 133 (FIG. 1) of a user and transmits the request to the media service 123 (FIG. 1) and/or another application 126 (FIG. 1). In response to the request, the client side application 179 receives personalized streaming media 193 that includes related content from the user's file system 133 and renders the personalized streaming media 193 on a display 113 (FIG. 1).

Beginning with box 503, the client side application 179 generates and transmits a request for personalized streaming media 193 that includes content from a user's file system 133 (FIG. 1) based on streaming media 189 received from a broadcast source. The streaming media 189 may comprise television shows, documentaries, movies, infomercials, music, and/or any other type of media capable of being broadcasted as streaming media 189. In one embodiment, the client side application 179 generates the request upon an indication by a user, as described above.

Then, in box 506, the client side application 179 receives the personalized streaming media 193 including related content from the user's file system 133. In one embodiment, related content from the user's file system 133 is determined from metadata associated with the streaming media 189. For instance, the meta data may include a summary of the streaming media 189, closed captioning of the streaming media 189, a frame-by-frame description of the streaming media 189, and/or any other type of description of the streaming media 189. Related files 146 (FIG. 1) may be determined from the metadata by matching the files 136 in the user's file system 133 with the content of the streaming media 189, as described above. Upon identifying the related files 146, the content of the related files 146 as identified by the data object reference 156 (FIG. 1) for the file 136 may be included in a relevant portion of the streaming media 189 to generate the personalized streaming media 193, as described above. For instance, the relevant portion or the streaming media 189 may be determined from the frame identifier 176. Finally, in box 509, the client side application renders the received personalized streaming media 193 on a display 113 associated with the client 106.

Figure 6:
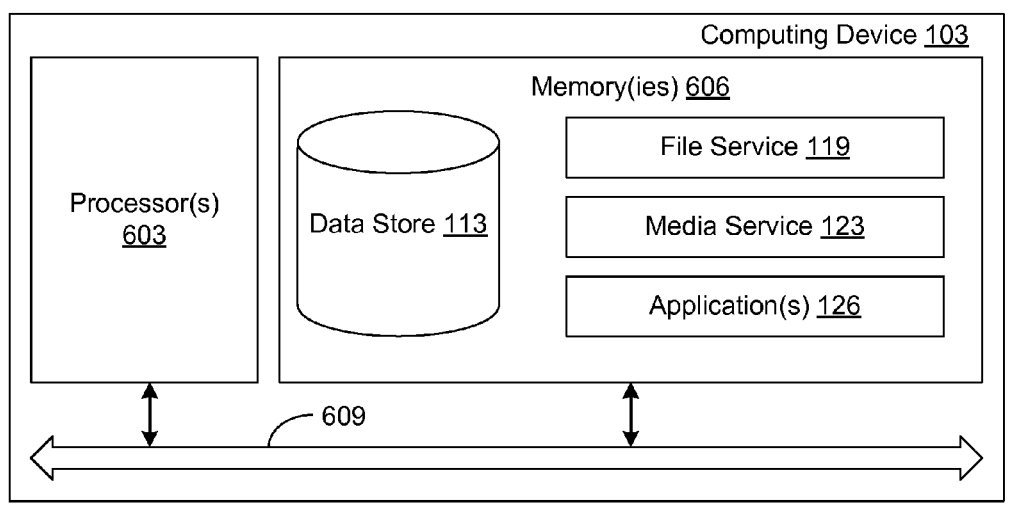
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the file service 119, the media service 123, and potentially other applications 126. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the file service 119, the media service 123, the application(s) 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the media service 123 and the client side application 179. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 119, the media service 123, and application(s) 126, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that receives a request from a requesting service to generate personalized streaming media based on content of streaming media broadcast from a broadcast source, wherein the streaming media comprises a plurality of frames, a frame identifier that specifies a frame for which content can be embedded, and a media type indicator that designates a type of media file that is eligible to be embedded within the frame indicated by the frame identifier;
   code that determines media content information of the streaming media, the media content information comprising at least one of a media name of the streaming media, a media summary of a subject matter of the streaming media, an audio transcription of the streaming media, or a plurality of frame descriptions for the plurality of frames of the streaming media;
   code that identifies a plurality of related files in at least one file system of a user that are related to the media content information;
   code that embeds the content of the plurality of related files in a relevant portion of the streaming media to generate the personalized streaming media, wherein one or more pieces of content for the plurality of related files are embedded in a portion of the frame of the streaming media indicated by the frame identifier and being of a same type of media file designated by the media type indicator for the frame indicated by the frame identifier with a remaining portion of the frame containing native content of the streaming media, wherein the embedded content of the plurality of related files is renderable for presentation as part of the personalized streaming media; and
   code that transmits the personalized streaming media having the embedded content to the requesting service.

2. The non-transitory computer-readable medium of claim 1, wherein the media content information is determined based at least in part from metadata encoded in a header of the streaming media.

3. The non-transitory computer-readable medium of claim 1, wherein the at least one file system is accessible through a network page and is associated with a file service account of the user on a client.

4. A system, comprising:
   at least one computing device; and
   a media service executable in the at least one computing device, the media service comprising:
      logic that obtains media content information associated with a portion of streaming media in response to a request from a client to consume the streaming media, wherein the streaming media comprises a plurality of frames, a frame identifier that specifies a frame for which content can be embedded, and a media type indicator that designates a type of media file that is eligible to be embedded within the frame indicated by the frame identifier;

logic that identifies a plurality of files in a file system that are related to the media content information; and logic that generates personalized streaming media by including content of at least one of the plurality of files in the frame of the streaming media indicated by the frame identifier and being of a same type of media file designated by the media type indicator for the frame indicated by the frame identifier, wherein the content of the at least one of the plurality of files is embedded in a portion of the frame of the streaming media with a remaining portion of the frame containing native content of the streaming media, wherein the embedded content of the at least one of the plurality of files is renderable for presentation as part of the personalized streaming media.

5. The system of claim 4, further comprising logic that stores the media content information in a data store accessible to the at least one computing device.

6. The system of claim 4, further comprising logic that stores identifying information of the plurality of files in a data store accessible to the at least one computing device.

7. The system of claim 4, wherein consuming the streaming media comprises at least one of viewing the streaming media, recording the streaming media, purchasing the streaming media, or renting the streaming media.

8. The system of claim 4, wherein the media content information comprises at least one of a media name of the streaming media, a media summary of a subject matter of the streaming media, an audio transcription of the streaming media, or a plurality of frame descriptions for a plurality of frames of the streaming media.

9. The system of claim 4, wherein the media content information is included in a metadata associated with the streaming media.

10. The system of claim 4, further comprising logic that provides the personalized streaming media to the client.

11. The system of claim 4, wherein the file system is accessible through a network page.

12. The system of claim 4, wherein the file system is associated with a file service account of a user on the client.

13. A method, comprising:

obtaining media content information associated with a portion of streaming media in response to a request from a client to consume the streaming media;

obtaining a plurality of files in a file system that are related to the media content information;

obtaining a frame identifier that specifies a frame of the streaming media for which content can be embedded, and a media type indicator that designates a type of media file that is eligible to be embedded within the frame indicated by the frame identifier; and generating personalized streaming media by including content of at least one of the plurality of files in the frame of the streaming media indicated by the frame identifier and being of a same type of media file designated by the media type indicator for the frame, wherein one or more pieces of content for the plurality of files are embedded in a portion of the frame of the streaming media with a remaining portion of the frame containing native content of the streaming media, wherein the embedded one or more pieces of content for the plurality of files are renderable for presentation as part of the personalized streaming media.

14. The method of claim 13, wherein the media content information comprises at least one of a media name of the streaming media, a media summary of a subject matter of the streaming media, an audio transcription of the streaming media, or a plurality of frame descriptions a plurality of frames of the streaming media.

15. The method of claim 13, further comprising transmitting the personalized streaming media having the embedded content to the client.

16. The method of claim 13, further comprising accessing the file system through a network page, wherein the file system is associated with a file service account of a user on the client.

17. The method of claim 13, wherein the streaming media comprises a plurality of frames.

18. The method of claim 13, wherein the media content information comprises a closed-caption portion of the streaming media.

19. The method of claim 13, wherein the plurality of files include an audio file related to the media content information, the method further comprising overlaying the audio file as an audio portion of the streaming media.

* * * * *